United States Patent [19]

Hormansdorfer

[11] Patent Number: 4,795,580

[45] Date of Patent: Jan. 3, 1989

[54] LATENT HEAT STORAGE MATERIAL AND USE THEREOF

[76] Inventor: Gerd Hormansdorfer, Kastanieneck 6 A, 3167 Burgdorf-Beinhorn, Fed. Rep. of Germany

[21] Appl. No.: 54,597

[22] PCT Filed: Sep. 17, 1986

[86] PCT No.: PCT/DE86/00369

§ 371 Date: May 14, 1987

§ 102(e) Date: May 14, 1987

[87] PCT Pub. No.: WO87/01716

PCT Pub. Date: Mar. 26, 1987

[30] Foreign Application Priority Data

Sep. 18, 1985 [DE] Fed. Rep. of Germany ....... 3533279

[51] Int. Cl.$^4$ ............................................. C09K 5/06
[52] U.S. Cl. ..................................... 252/70; 568/852; 568/868
[58] Field of Search ................... 252/70; 568/852, 868

[56] References Cited

U.S. PATENT DOCUMENTS 4,295,517 10/1981 Guex ......................................... 165/1
4,304,798 12/1981 Clapp et al. ............................. 252/70

FOREIGN PATENT DOCUMENTS 137063 4/1985 European Pat. Off. .
893290 4/1962 United Kingdom .
2023280 12/1979 United Kingdom .

OTHER PUBLICATIONS

Brimacombe et al., "Alditols and Derivatives" in *The Carbohydrates*, Pigman et al., Ed., Academic Press, New York, 1972, pp. 479–518.

Primary Examiner—Robert A. Wax
Attorney, Agent, or Firm—Glen R. Grunewald; Thomas R. Lampe

[57] ABSTRACT

Latent heat storage medium based on polyvalent aliphatic alcohols of the general formula (I) where $n=4, 6$ or 8 (preferably 4 or 6) and with such a configuration isomerism that there is created a configuration which is symmetrical about the middle of the chain. Preferably two or more of these alcohols are used mixed together, whereby the melting temperature and/or the supercooling temperature of the medium can be regulated to a specific value by choosing the ratio of the mixture, which can be eutectic, hypoeutectic or hypereutectic. The proposed latent heat storage media are ideal for use in heat protection systems for measurement probes used in geotechnic bore holes. They cover the required temperature range, are marked by unusually high volume/-specific melting enthalpy at moderate densities, are cycle-resistant and exhibit low heat conductivity. The boiling points are often significantly above 300° C., and their temperature resistance extends substantially into the boiling point range. In addition, construction materials are not attacked by them, and also their physiological safety is guaranteed.

12 Claims, 1 Drawing Sheet

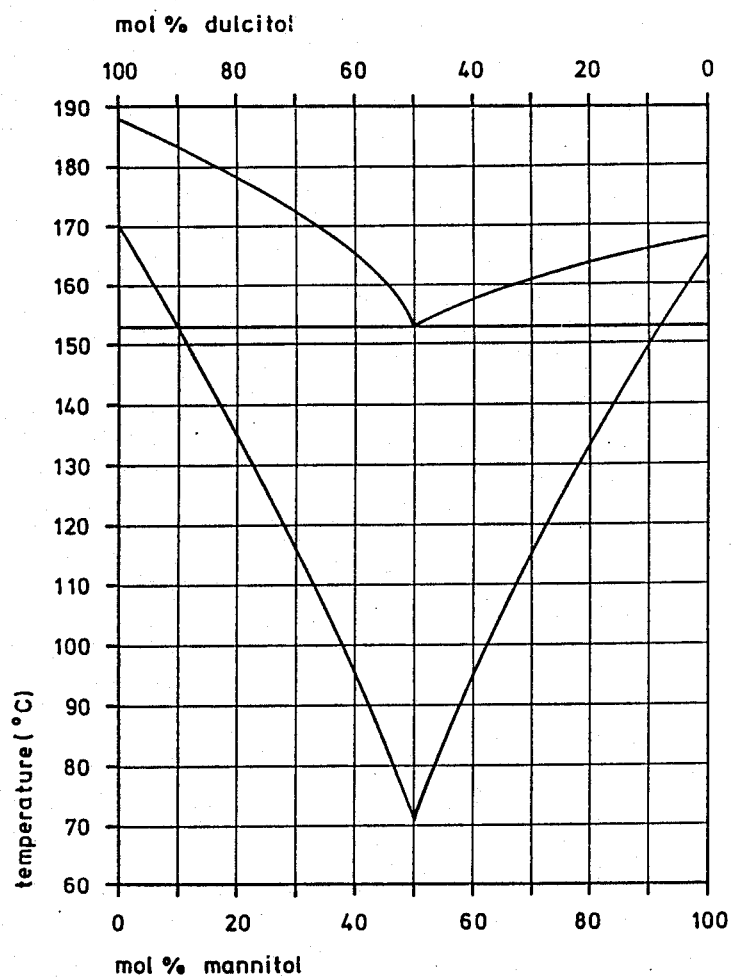

LATENT HEAT STORAGE MATERIAL AND USE THEREOF

The invention concerns a latent heat storage material on the base of multivalent aliphatic alcohols of the general formula

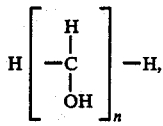

$$H\left[\begin{array}{c} H \\ | \\ -C- \\ | \\ OH \end{array}\right]_n H, \quad (A)$$

i.e. such ones with unramified hydrocarbon chain and one hydroxyl group per C-atom. Furthermore the invention concerns a preferred use of this material.

Latent heat storage materials are used in numerous heat transfer processes as means of heat storage. They possess a melting point, which lies in the working temperature range of the heat transfer process, so that they during warm-up change over from the solid to the liquid phase, and during cool-down return to the solid phase, thus likewise absorbing and releasing again latent heat (heat of fusion). In comparison with so-called capacitive heat storage materials (i.e. such ones, on those the state of aggregation does not change in the range of working temperature, so that only sensible heat is absorbed and released again) latent heat storage materials have with that the advantage, that they make possible the storage of a larger amount of energy within a narrow range of temperature at a relatively small requirement of volume.

In general latent heat storage materials should possess a melting enthalpy as high as possible, at which it particularly depends upon the volumetric (i.e. to the volume related) specific melting enthalpy, in order to create a maximum of storage capacity per volume unit of storage plant. Besides this they must be cycle proof, i.e. the phase transition solid-liquid-solid must retain reversible reproduceable over a long period of times and should not be affected by chemical reactions, demulgations or the like effects. Furthermore important criteria could be the solidification behaviour (e.g., the formation of a metastable melt, the quantity of volume change during phase transition, or the form of cristallisation) and the compatibility with construction materials, the physiological harmlessness and the availability to acceptable costs. It has proved difficult until now, to find latent heat storage materials, which accomplish the whole of this criteria in an optimal manner to the respective application.

Many of the so-far known latent heat storage materials have been developed to be used in the domain of room heating and accordingly melting points in the range of domestic water. Besides anorganic substances, like salt hydrates and salt mixtures (which are oftenly corrosive and less cycle proof) organic substances including some alcohols have already been proposed likewise for that purpose. Thus the DE-A No. 28 56 374 describes the use of simple alcohols like stearyl alcohol, hexadecanol or octanediol as latent heat storage material for solar heating systems. The melting enthalpy on a volume base of these simple alcohols however is comparably small by reason of their low density. Furtheron the DE-A No. 27 47 664 describes the use of xylitol (that is an alcohol according to the common formula A mentioned at the beginning with n=5) as latent heat storage material for heat packs or for heating systems which work with solar energy or electrical night current. Compared to simple alcohols xylitol possesses a higher specific melting enthalpy on a volume base, but forms during cool-down a marked metastable melt, which even at room temperature still is permanent and which could only be brought to cristallisation by additional means as the use of nucleation agents, rubbing or ultrasonic affection. This may be useful for the provided application of the DE-A No. 27 47 664, but is not so in the most other cases.

Another special application of latent heat storage materials is the use within heat protection systems for borehole probes in deep geotechnical wells. In this case the point is to keep an electronic measuring unit, which is placed in a dewar-like heat-shield, at a low temperature (i.e. between 70° and 125° C.) on an utmost period of time, while a measuring-log is run in a borehole at a rinsing-water temperatures up to 200°–300° C. For that usually cartridge-like latent heat sinks are placed in front and behind the measuring unit, which are filled up with the latent heat storage material and as a rule possess a whole volume of only about 0.5 to 2 liters.

This application case makes requirements to the latent heat storage materials, which could not be met by those latent heat storage materials which are known from the domain of domestic heating. Thus until now low melting metal alloys, e.g. Wood's metal, are used here as latent heat storage material. Low melting metal alloys however have the disadvantage of a high density, which lies between 9 and 10 kg/dm$^3$ and leads to a high total weight of the latent heat sink. Thereby in particular the relatively thin inner wall of the heatshield is run to risk during shaking. This could not be counteracted by a thicker inner wall of the heat-shield, because its isolation value would be changed for the worse by that. Moreover an actual examination of such heat protection systems (LA-9671-HDR, G. A. Bennett, G. R. Sherman, Analysis and Thermal Design Improvements of Downhole Tools for Use in Hot Dry Wells, Los Alamos National Laboratory) proved, that in addition the particular heat conduction of the low melting metal alloys is an aggravating disadvantage, because of that a increased heat current is transported across the latent heat sinks into the inner of the heat protection system. It is further mentioned in this examination that the supposition for a conveniently working system is a even more higher melting enthalpy of the latent heat storage materials to be used, compared to the low melting metal alloys. The melting enthalpies of the low melting metal alloys on a weight base are namely relatively low, so that the values of the specific melting enthalpies on a volume base remain unsatisfactory. With that in this case exist the same unprofitable conditions as to the opposite case of a higher melting enthalpy on a weight base and a very low density of the latent heat storage material.

Consequently exists a requirement of a improved latent heat storage material especially for heat protection systems in boreholes, which possesses at melting points in the range between about 50° and 150° C. an utmost melting enthalpy on a volume base and moderate densities between about 1 and 2 kg/dm$^3$, a low heat conductivity, which is resistant to high temperatures (if possible to the range of 300° C.) and for the rest meets as optimal as possible the requirements of cycle firmness, solidification behaviour, compatibility with construction materials, physiologic harmlessness and availability.

With the invention such a improved latent heat storage material is placed at disposal and that according to the invention at the base of multivalent aliphatic alcohols of the common formula

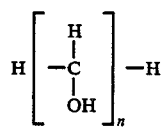 (A)

with n=4, 6 or 8 and such isomeric configuration, that the configuration in reference to the chain centre is symmetric.

The invention is based on the surprising discovery, that alcohols according to the common formula (A) are outstanding suited as latent heat storage materials especially for borehole heat protection systems if their chain length is an even number and at the same time their configuration in reference to the chain centre is symmetric. It was namely discovered, that the according to the invention as latent heat storage materials proposed alcohols in comparison with those likewise to the common formula (A) belonging alcohols with uneven chain length (e.g. xylitol with n=5) and/or unsymmetric configuration not only show a significant higher melting enthalpy, but also possess a noticeable less supercooling of the melt and above all have the property to change over to the crystalline phase spontaneously and reproduceable at a defined fixed supercooling temperature during cool-down. These phenomena could not been foreseen and neither can be scientifically explained at the moment.

From the according to the invention as latent heat storage materials proposed alcohols are those preferred with n=4 or 6, thus the tetritols and hexitols with symmetric configuration. These are erythritol and threitol with n=4, and dulcitol, allitol, iditol and mannitol with n=6. The configuration of these preferred alcohols can be either mirror-symmetric (erythritol, dulcitol or allitol) or axis-symmetric (threitol, iditol or mannitol), always referred to the chain centre, as it is illustrated in the enclosed Table 1. In addition the data of the most important of these preferred alcohols are shown in Table 2.

Preferably the according to the invention as latent heat storage materials proposed alcohols are not used as pure substances, but as a mixture of two or more substances, at which at least one mixture component should possess a mirror-symmetry. It has been discovered, that the melt of the by the invention proposed alcohols are miscible in any relation, and form eutectica during cool-down, which are binary, ternary or higher in dependence of the number of mixed ingredients, and for which some examples are given in table 2 likewise. By the use of such mixtures, which could be eutectic, hyper-eutectic or hypo-eutectic, consequently lower melting temperatures could be adjusted, which are commonly desired in respect of a thermal strain as low as possible on the measuring probe. Moreover the mixtures form a finer and more homogeneous cristalline structure compared to the pure substances, while already the addition of a small amount of e.g. 0.5 mol% of a mixture component advantageously influences the cristalline structure.

Another important advantage of the mixtures result from their supercooling behaviour. For latent heat storage materials which shall be used as temporary heat protection, a certain supercooling, thus the formation of a metastable melt, is generally desired, because the heat of cristallisation is released thereby with delay. This supercooling is relatively low (up to about 20 K.) at the pure substances, exhibits a maximal value for eutectic mixtures and runs almost linear to the mixture ratio on hypo-eutectic or hyper-eutectic mixtures, as this is shown in FIG. 1 on the example of the system of dulcitol/mannitol. There the curve 1 shows the course of the melting temperature and the curve 2 the course of the supercooling temperature (i.e. the temperature, at which the metastable melt changes over reproduceable and spontaneously in the crystalline phase), each in dependence of the mixture ratio. By selection of the mixture ratio the respectively desired supercooling thus can be adjusted accurately, and that appropriately in such a manner, that the supercooling temperature according to curve 2 does not lie below about 50° C. By that it is achieved, that the melt has changed over with certainty to the cristalline phase at normal environment temperatures and that it could be controlled by simply touching the latent heat sinks by hand, if this is the case.

Altogether the according to the invention as latent heat storage materials proposed alcohols accomplish the requirements for the application in an ideal manner. They cover the necessary temperature range, distinguish themselves by unusually high volumetric specific melting enthalpies at moderate densities, are cycle proof and exhibit a low heat conduction. Their boiling points lie partly considerably over 300° C., while the thermic stability extends in the main into the range of the boiling point, and their supercooling can be adjusted purposeful. Moreover they do not affect construction materials and the physiological harmlessness is guarantied. With that they allow now the fabrication of heat protection systems with considerably improved working time and with further essential advantages, which have not been possible until now.

TABLE 1

| configurations | | |
|---|---|---|
| mannitol | allitol | iditol |
| CH₂OH | CH₂OH | CH₂OH |
| HO—C—H | H—C—OH | HO—C—H |
| HO—C—H | H—C—OH | H—C—OH |
| H—C—OH | H—C—OH | HO—C—H |
| H—C—OH | H—C—OH | H—C—OH |
| CH₂OH | CH₂OH | CH₂OH |
| dulcitol | erythritol | threitol |
| CH₂OH | CH₂OH | CH₂OH |
| H—C—OH | H—C—OH | HO—C—H |
| HO—C—H | H—C—OH | H—C—OH |
| HO—C—H | CH₂OH | CH₂OH |
| H—C—OH | | |
| CH₂OH | | |

TABLE 2

| substance | melting point (°C.) | density (kg/dm³) | melting enthalpy (kJ/kg) | melting enthalpy (kJ/dm³) |
| --- | --- | --- | --- | --- |
| threitol (T) | 71 | 1.46 | 223 | 326 |
| erythritol (E) | 119 | 1.46 | 334 | 488 |
| mannitol (M) | 167 | 1.50 | 306 | 459 |
| dulcitol (D) | 189 | 1.50 | 358 | 537 |
| eutectica(+) | | | | |
| M/D 50:50 | 153 | 1.50 | 282 | 423 |
| E/M 80:20 | 113 | 1.50 | | |
| E/D 80:20 | 115 | 1.50 | | |
| E/M/D 80:10:10 | 109 | 1.50 | 274 | 411 |

(+)the numbers indicate the molecular ratio of the eutectic mixture.

I claim:

1. In a heat protection system for borehole probes having a latent heat sink in the form of a cartridge filled with latent heat storage material, the improvement comprising a latent heat storage material comprising a multivalent aliphatic alcohol having the formula:

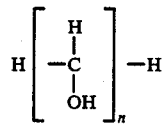

wherein n is 4, 6 or 8 and wherein the isomeric configuration is symmetric with reference to the chain center.

2. Latent heat storage materials according to claim 1, at which the configuration of the alcohols is mirror-symmetric in reference to the chain centre.

3. Latent heat storage materials according to claim 1, at which the configuration of the alcohols is axis-symmetric in reference to the chain centre.

4. Latent heat storage material according to claim 2, at which the alcohol is erythritol (n=4).

5. Latent heat storage materials according to claim 2, at which the alcohols are dulcitol or allitol (n=6).

6. Latent heat storage material according to claim 3, at which the alcohol is threitol (n=4).

7. Latent heat storage materials according to claim 3, at which the alcohols are iditol or mannitol (n=6).

8. Latent heat storage materials according to claim 1, at which two or more of the alcohols exist in mixture with each other.

9. Latent heat storage materials according to claim 8, at which at least one in the form of a mixture with each other existing alcohols possesses a mirror-symmetric configuration.

10. In a method for controlling the temperature of an instrument in the borehole of a well by maintaining said instrument in heat transfer contact with a cartridge containing latent heat storage material, the improvement comprising maintaining within said cartridge a multivalent aliphatic alcohol having the formula:

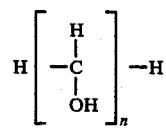

wherein n is 4, 6 or 8 and wherein the isomeric configuration is symmetric with reference to the chain center.

11. The method of claim 10 wherein said cartridge contains a mixture of two of said aliphatic alcohols.

12. The method of claim 11 wherein one of said aliphatic alcohols has a mirror symmetric configuration.

* * * * *